(12) United States Patent
Isenhour et al.

(10) Patent No.: US 10,048,457 B2
(45) Date of Patent: Aug. 14, 2018

(54) ELECTRO-OPTICAL CONNECTOR SYSTEMS INCORPORATING GRADIENT-INDEX LENSES

(71) Applicant: Corning Optical Communications LLC, Hickory, NC (US)

(72) Inventors: Micah Colen Isenhour, Lincolnton, NC (US); James Phillip Luther, Hickory, NC (US); Michael Wimmer, Berlin (DE)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/046,943

(22) Filed: Feb. 18, 2016

(65) Prior Publication Data

US 2016/0161690 A1 Jun. 9, 2016

Related U.S. Application Data

(63) Continuation of application No. 14/291,527, filed on May 30, 2014, now Pat. No. 9,297,968.

(51) Int. Cl.
*G02B 6/36* (2006.01)
*G02B 6/42* (2006.01)
(Continued)

(52) U.S. Cl.
CPC .......... *G02B 6/4292* (2013.01); *G02B 6/325* (2013.01); *G02B 6/3817* (2013.01);
(Continued)

(58) Field of Classification Search
CPC ...... G02B 6/4292; G02B 6/4284; G02B 6/43; G02B 6/3817; G02B 6/4278; G02B 6/42
(Continued)

(56) References Cited

U.S. PATENT DOCUMENTS 5,757,993 A * 5/1998 Abe .................. G02B 6/32
385/34
6,102,581 A 8/2000 Deveau et al.
(Continued)

OTHER PUBLICATIONS

Bidirectional Dynamic Data Transmission Through a Rotary Interface, Dagong Jia et al., Optical Engineering, vol. 44 (5), May 2005, 2 pages.

*Primary Examiner* — Ellen Kim
(74) *Attorney, Agent, or Firm* — Michael E. Carroll, Jr.

(57) ABSTRACT

Electro-optical connectors and connector systems are disclosed. In one embodiment, an electro-optical plug includes a tip connector, a ring connector, and a sleeve connector, wherein the tip connector, the ring connector, and the sleeve connector are electrically conductive. The electro-optical plug further includes a gradient-index lens co-axially disposed within at least the tip connector, wherein the tip connector has a tip window that optically exposes a coupling surface of the gradient-index lens, and an optical fiber that is co-axially disposed within at least the sleeve connector. In another embodiment, an electro-optical connector includes a plug body having a planar electrical coupling surface with an array of electrically conductive contacts, and an optical coupling surface having at least one optical window. The electro-optical connector further includes a gradient-index lens disposed within the plug body. A coupling surface of the gradient-index lens is optically exposed at the at least one optical window.

20 Claims, 11 Drawing Sheets

(51) Int. Cl.
  *G02B 6/32* (2006.01)
  *G02B 6/38* (2006.01)
(52) U.S. Cl.
  CPC .......... *G02B 6/4293* (2013.01); *G02B 6/3853* (2013.01); *G02B 6/4206* (2013.01)
(58) Field of Classification Search
  USPC .......................................... 385/93, 76–81, 84
  See application file for complete search history.

(56) References Cited

U.S. PATENT DOCUMENTS

| | | | |
|---|---|---|---|
| 6,217,230 B1 | 4/2001 | Matsushita | |
| 6,909,821 B2 | 6/2005 | Ravasio et al. | |
| 8,109,675 B1* | 2/2012 | Zhovnirovsky | G02B 6/4263 385/100 |
| 8,573,861 B2 | 11/2013 | Terlizzi et al. | |
| 8,613,561 B2* | 12/2013 | Ko | G02B 6/3817 385/53 |
| 8,646,991 B2* | 2/2014 | Sakurai | G02B 6/3817 385/92 |
| 8,705,184 B2 | 4/2014 | Xu et al. | |
| 8,753,020 B2* | 6/2014 | Wu | H01R 13/6593 385/147 |
| 8,974,126 B2* | 3/2015 | Sloey | G02B 6/3817 385/93 |
| 9,039,304 B2* | 5/2015 | Ko | G02B 6/4201 385/88 |
| 9,188,757 B2* | 11/2015 | Wu | G02B 6/428 |
| 2010/0080519 A1* | 4/2010 | Ko | G02B 6/4292 385/93 |
| 2011/0096323 A1* | 4/2011 | Liu | G02B 6/3882 356/73.1 |
| 2011/0142401 A1* | 6/2011 | Lin | G02B 6/3817 385/77 |
| 2012/0189252 A1 | 7/2012 | Bhagavatula et al. | |
| 2013/0087690 A1 | 4/2013 | Sloey et al. | |
| 2013/0089290 A1 | 4/2013 | Sloey et al. | |
| 2013/0223798 A1 | 8/2013 | Jenner et al. | |
| 2013/0289396 A1 | 10/2013 | Kitatsuji et al. | |
| 2014/0270626 A1 | 9/2014 | Isenhour et al. | |
| 2015/0055948 A1 | 2/2015 | Butler et al. | |

* cited by examiner

ELECTRO-OPTICAL CONNECTOR SYSTEMS INCORPORATING GRADIENT-INDEX LENSES

CROSS-REFERENCE TO RELATED APPLICATIONS

This application is a continuation of and claims the benefit of priority to co-pending U.S. application Ser. No. 14/291,527, filed on May 30, 2014, and is incorporated herein by reference in its entirety.

BACKGROUND

The present disclosure generally relates to hybrid electrical-optical ("electro-optical") connectors and, more particularly, electro-optical connectors and connector systems utilizing gradient-index lenses.

Benefits of optical fiber include extremely wide bandwidth and low noise operation. Because of these advantages, optical fiber is increasingly being used for a variety of applications, including, but not limited to, broadband voice, video, and data transmission. Additionally, optical cable assemblies may be utilized in consumer electronics applications to transfer data between electronic devices.

Optical connectors are employed in both optical cable assemblies and electronic devices to provide an optical-to-optical connection wherein optical signals are passed between an optical cable assembly and an electronic device. Legacy and future electrical connector standards may benefit from the addition of optical fibers to provide additional functionality beyond the electrical power and data carried by electrical conductors. For example, additional bandwidth may be provided by adding optical fibers to electrical cables. Further, the length of cable assemblies may be increased by the use of optical fibers, particularly in high-speed data applications where noise and electrical losses are important considerations.

SUMMARY

Embodiments are directed to electro-optical connector systems including an electro-optical connector for providing functionality over both electrical conductors and optical fiber. More specifically, the electro-optical connectors described herein are capable of bi-directionally communicating optical signals over a single optical fiber. The electro-optical connectors described herein use gradient-index lenses as a rugged interface between the optical fiber of the electro-optical connector and an active component of an electro-optical receptacle. Embodiments described herein also describe debris-relief zones and features that prevent optical loss due to debris build-up.

In one embodiment, an electro-optical plug includes a tip connector, a ring connector, and a sleeve connector, wherein the tip connector, the ring connector, and the sleeve connector are electrically conductive. The electro-optical plug further includes a gradient-index lens co-axially disposed within at least the tip connector, wherein the tip connector has a tip window that optically exposes a coupling surface of the gradient-index lens, and an optical fiber that is co-axially disposed within at least the sleeve connector. The optical fiber is optically coupled to the gradient-index lens.

In another embodiment, an electro-optical connector system includes an electro-optical plug and an electro-optical receptacle. The electro-optical plug includes a tip connector, a ring connector, and a sleeve connector, wherein the tip connector, the ring connector, and the sleeve connector are electrically conductive. The electro-optical plug further includes a gradient-index lens co-axially disposed within at least the tip connector, wherein the tip connector has a tip window that optically exposes a coupling surface of the gradient-index lens, and an optical fiber that is co-axially disposed within at least the sleeve connector. The optical fiber is optically coupled to the gradient-index lens. The electro-optical receptacle includes a receptacle body. The receptacle body includes an insertion end having an opening configured to receive the electro-optical plug, an optical coupling end that is opposite from the insertion end, and a plug bore within the receptacle body. The plug bore extends from the opening toward an end wall at the optical coupling end, and is configured to accept the electro-optical plug. The receptacle body further includes a lens feature at the end wall of the plug bore, wherein the coupling lens feature defines a debris-relief zone at the end of the plug bore. The electro-optical receptacle further includes an active component assembly disposed at the optical coupling end of the receptacle body. The active component assembly includes a substrate and at least one active component coupled to the substrate, wherein the at least one active component is optically coupled to the lens feature of the electro-optical receptacle.

In yet another embodiment, an electro-optical connector includes a plug body having a planar electrical coupling surface with an array of electrically conductive contacts, and an optical coupling surface having at least one optical window, wherein the optical coupling surface is transverse to the planar electrical coupling surface. The electro-optical connector further includes at least one gradient-index lens disposed within the plug body, wherein a coupling surface of the gradient-index lens is optically exposed at the at least one optical window. The electro-optical connector further includes at least one optical fiber optically coupled to the at least one gradient-index lens.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Embodiments are directed to electro-optical connector systems utilizing both electrical conductors and optical fibers to communicate data between electronic devices. Embodiments may utilize wavelength-division multiplexing (e.g., coarse wavelength-division multiplexing ("CWDM") or dense wavelength-division multiplexing ("DWDM") to bi-directionally communicate optical signals over a single fiber. The addition of optical fiber allows cables and connectors to increase bandwidth over traditional cables that communicate over electrical conductors only.

The electro-optical connectors systems described herein incorporate one or more gradient-index ("GRIN") lenses to provide optical coupling between an optical fiber of an electro-optical plug with a transceiver device (i.e., an active component) that transmits and/or receives optical signals. The GRIN lens provides a robust optical interface with mating features of the corresponding receptacle. Various embodiments of electro-optical connectors and connector systems are described in detail below.

Figure 1:
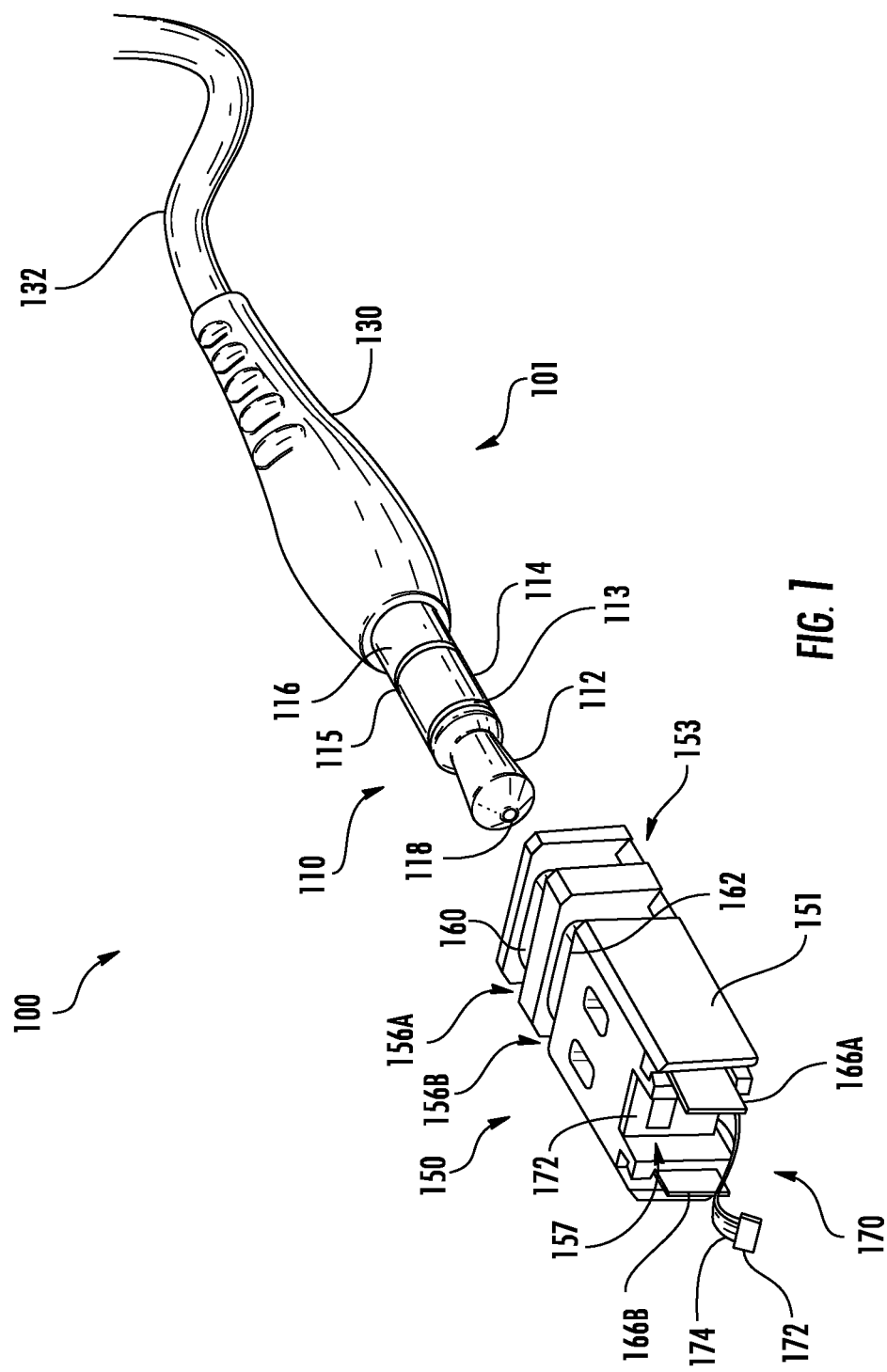
FIG. 1 is a perspective view of an example electro-optical connector system including an electro-optical plug and an electro-optical receptacle.

Referring now to FIG. 1, an electro-optical connector system 100 according to one embodiment is illustrated. The example electro-optical connector system 100 comprises an electro-optical plug 101 and a corresponding electro-optical receptacle 150. The electro-optical plug 101 is configured to be inserted into the electro-optical receptacle 150.

The example electro-optical plug 101 is configured as a phone jack (i.e., an audio jack). The phone jack is a ubiquitous electrical connector form-factor used to electrically couple two electronic devices. For example, a phone jack may be used to provide stereo audio signals from a portable electronic device, such as a media player or a cell phone, to headphones. As examples and not limitations, a phone jack may be used to provide stereo sound signals, electrical power, and data.

Generally, the electro-optical plug 101 is configured as a tip-ring-sleeve ("TRS") phone jack comprising a tip connector 112, a ring connector 114, and a sleeve connector 116. The tip connector 112, ring connector 114, and sleeve connector 116 are electrically conductive and extend from a plug body 130. The tip connector 112 is electrically isolated from the ring connector 114 by a first insulator 113, and the ring connector 114 is electrically isolated from the sleeve connector 116 by a second insulator 115. Each of the tip connector 112, ring connector 114, and sleeve connector 116 are electrically coupled to an individual conductive wire (not shown) disposed with a cable 132 having an outer jacket that extends from the plug body 130.

Embodiments are not limited to TRS phone jacks, as other configurations may also be utilized, such as a tip-ring-ring-sleeve ("TRRS") connector wherein an additional ring connector is provided. Additionally, the electro-optical plug 101 may be configured as a 3.5 mm phone jack, a 2.5 mm phone jack, or other phone jack style and size.

The tip connector 112 includes a tip window 118 at its front surface. The tip window optically exposes a gradient-index ("GRIN") lens 122 that is co-axially disposed within at least the tip connector 112 (see FIG. 2). An optical fiber 121 is co-axially disposed within the tip connector 112, the ring connector 114, and the sleeve connector 116, and is optically coupled to the GRIN lens 122. Optical signals may pass to and from the GRIN lens 122 through the tip window 118. Components of the electro-optical plug 101 are described in more detail below with reference to FIGS. 2 and 3.

The optical channel formed by the GRIN lens 122 and optical fiber 121 may provide for high-speed, bi-directional optical communication. The optical signals may allow two electronic devices to communicate large amounts of data between each other at a high data rate. Such data may include, but is not limited to, electronic files, control data (e.g., noise-canceling data for headphones), and audio/video data.

Figure 4:
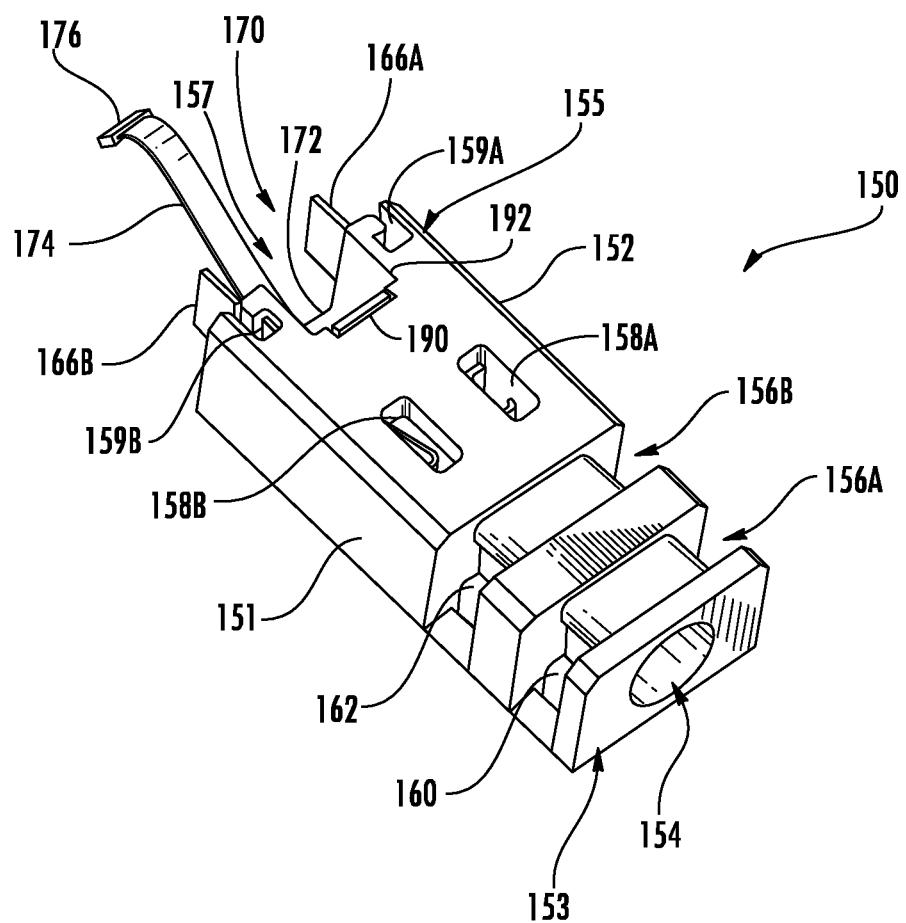
FIG. 4 is a top, front perspective view of the electro-optical receptacle depicted in FIG. 1 according to one or more embodiments described and illustrated herein.

The electro-optical plug 101 is insertable into the electro-optical receptacle 150 (see FIG. 4). The electro-optical receptacle 150 comprises a receptacle body 151 having an insertion end 153 and an optical coupling end 155 that is opposite from the insertion end 153. In some embodiments, the receptacle body 151 is fabricated from a material that is transmissive to the wavelength(s) of optical signals passed between the electro-optical receptacle 150 and the electro-optical plug 101. As non-limiting examples, the receptacle body 151 may be fabricated from ULTEM™ sold by SABIC Innovative Plastics Holding BV of Riyadh, Saudi Arabia, or Zeonex® cyclic olefin polymer sold by Zeon Chemicals LP of Louisville, Ky., USA.

Generally, the receptacle body 151 includes notches 156A and 156B in which electrical contact clips 160, 162 are disposed, respectively. Electrical contact clip 160 is positioned within the receptacle body 151 to contact, and therefore be electrically coupled to, the sleeve connector 116 when the electro-optical plug 101 is inserted into the electro-optical receptacle 150. Electrical contact clip 162 is positioned within the receptacle body 151 to contact, and therefore be electrically coupled to, the ring connector 114 when the electro-optical plug 101 is inserted into the electro-optical receptacle 150.

An active component assembly 170 is disposed within a notch 157 at the optical coupling end 155 of the receptacle body 151. Additionally electrical contact clips 166A, 166B are positioned within the optical coupling end 155 of the receptacle body 151. Electrical contact clips 166A, 166B are disposed within the receptacle body 151 to contact, and therefore be electrically coupled to, the tip connector 112 of the electro-optical plug 101 when it is inserted into the electro-optical receptacle 150. As described in more detail below, the active component assembly 170 transmits and receives optical signals by converting electrical signals to optical signals and vice versa (i.e., a transmitter and a receiver).

Figure 2:
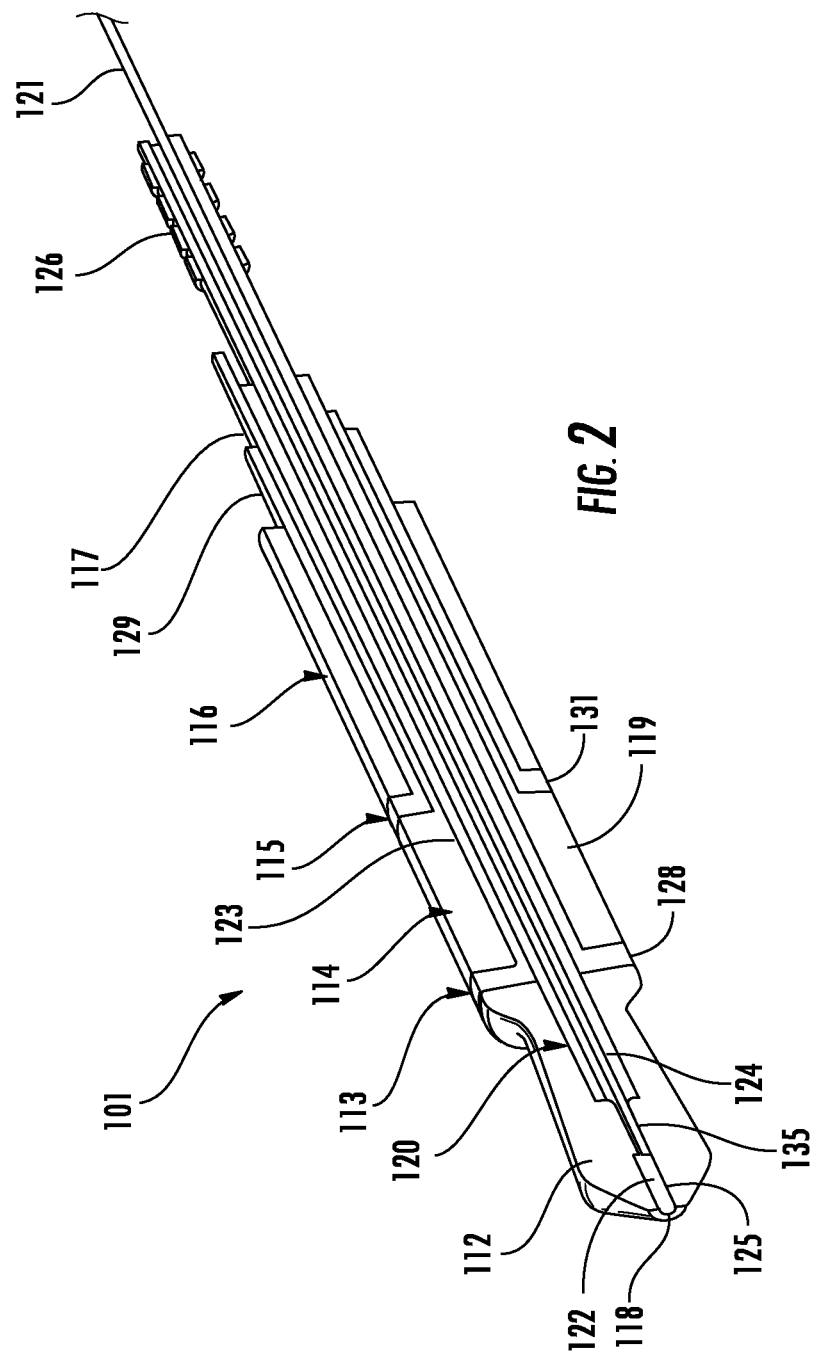
FIG. 2 is a perspective cutaway view of the electro-optical plug depicted in FIG. 1 according to one or more embodiments described and illustrated herein.

The electro-optical plug 101 will now be described in greater detail with reference to FIGS. 2 and 3A. FIG. 2 is a cross-sectional view of the tip connector 112, the ring connector 114, and the sleeve connector 116 of the electro-optical plug 101, while FIG. 3 is cross-sectional view of the tip connector 112, the ring connector 114, and the sleeve connector 116 and additional components of the electro-optical plug 101.

In the illustrated embodiment, the tip connector 112, the first insulator 113, the ring connector 114, the second insulator 115, and the sleeve connector 116 are maintained by a co-axially positioned support member 124. The support member 124 is hollow such that an optical fiber 121 may be positioned therein. The aforementioned components may be positioned on the support member 124 in a nested manner. The ring connector 114 comprises a stem portion 117 and a contact portion 119, wherein the contact portion 119 has a larger diameter than the stem portion 117. The first and second insulators 113, 115, each comprises a flange portion 128, 131, respectively, and a stem portion 123, 129, respectively. Each of the tip connector 112, the first insulator 113, the ring connector 114, the second insulator 115, and the sleeve connector 116 defines an internal bore 120 into which the support member 124 is positioned when the components are assembled.

In the example embodiment, the first insulator 113 is positioned on the support member 124 such that the stem portion 123 of the first insulator 113 is adjacent to the support member 124. The ring connector 114 is positioned on the stem portion 123 of the first insulator, while the sleeve connector 116 is positioned on the stem portion 129 of the ring connector 114. The tip connector 112 is positioned on an end of the support member 124. The assembly may be maintained by an optional crimp member 126, and may be at least partially disposed within the plug body 130. Additionally, the components of the electro-optical plug 101 may be maintained together by an interference fit and/or by an adhesive. In some embodiments, the support member 124 and associated components may be held together by a threaded engagement.

In the illustrated embodiment, the ring connector 114 and the sleeve connector 116 may be electrically coupled to conductive wires that are disposed within the cable 132. As an example and not a limitation, a tab may be provided on the ring connector 114 and the sleeve connector 116 to connect the ring connector 114 and the sleeve connector 116 to the conductive wires. In some embodiments, the ring connector 114 and the sleeve connector 116 may provide electrical power to an electronic device to which it is coupled. The ring connector 114 and the sleeve connector 116 may also provide audio signals or data.

In some embodiments, the support member 124 is also electrically conductive such that it provides an electrically conductive pathway between the tip connector 112 and a conductive wire in the cable 132. The tip connector 112 may then provide a power connection, audio signal, or other data.

The optical fiber is disposed within the support member 124, which is disposed within the internal bore 120 defined by the tip connector 112, the first insulator 113, the ring connector 114, the second insulator 115, and the sleeve connector 116. The illustrated tip connector 112 includes a fiber bore 135 that tapers from the internal bore 120, and a lens bore 125. As shown in FIG. 2, the support member 124 is disposed within the internal bore 120, while the optical fiber 121 extends into the smaller-diameter fiber bore 135 where it terminates at the transition into the lens bore 125. The GRIN lens 122 is disposed within the lens bore 125 such that a coupling surface 127 of the GRIN lens 122 is positioned proximate to the tip window 118, and the opposite surface 134 of the GRIN lens 122 contacts, or nearly contacts, the end of the optical fiber 121. In some embodiments, the optical fiber 121 may be maintained within the fiber bore 135 by an index-matching adhesive.

The tip window 118 may be configured as a small opening within a face of the tip connector 112 such that it optically exposes the coupling surface 127 of the GRIN lens 122. FIG. 3B provides a close-up perspective view of an example GRIN lens 122. In some embodiments, the tip window 118 physically exposes the coupling surface of the GRIN lens 122. In other embodiments, a transmissive window material may be provided at the face of the tip connector such that the coupling surface of the GRIN lens 122 is maintained behind the transmissive window material. The surfaces of the GRIN lens 122 may be laser polished.

Figure 3A:
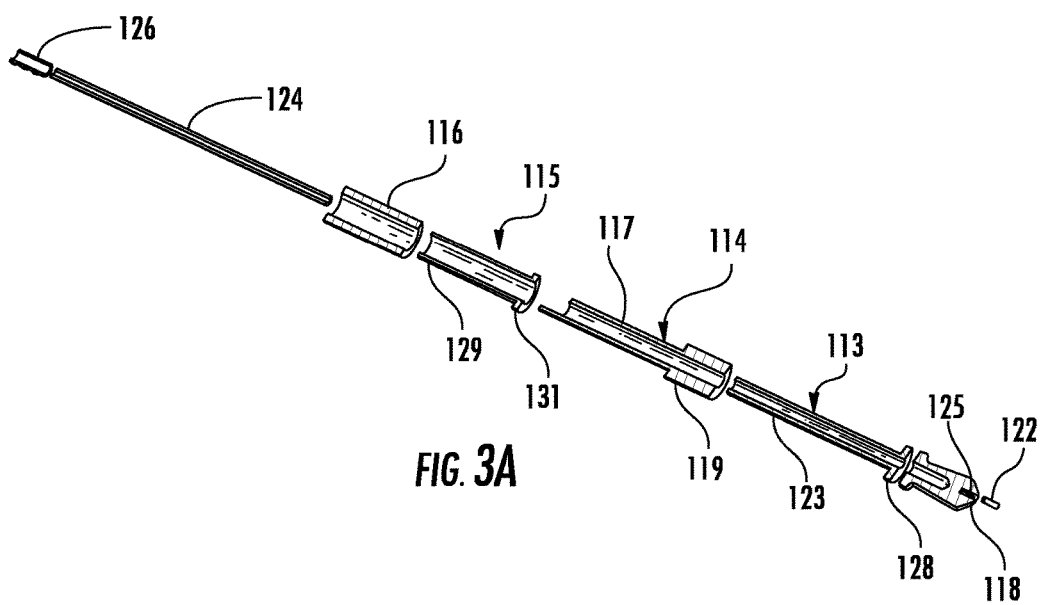
FIG. 3A is an exploded cutaway view of the electro-optical plug depicted in FIG. 2.
Figure 3B:
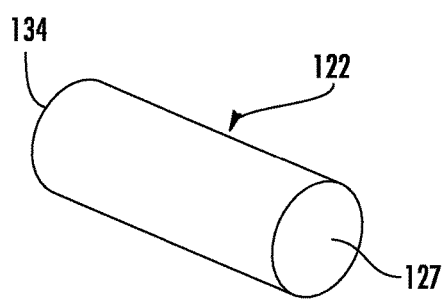
FIG. 3B is a perspective view of a gradient-index lens within the electro-optical plug depicted in FIGS. 2 and 3A.

It should be understood that embodiments of the present disclosure are not limited to the arrangement of the components in FIGS. 2 and 3A, and that other arrangements are also possible.

Figure 5:
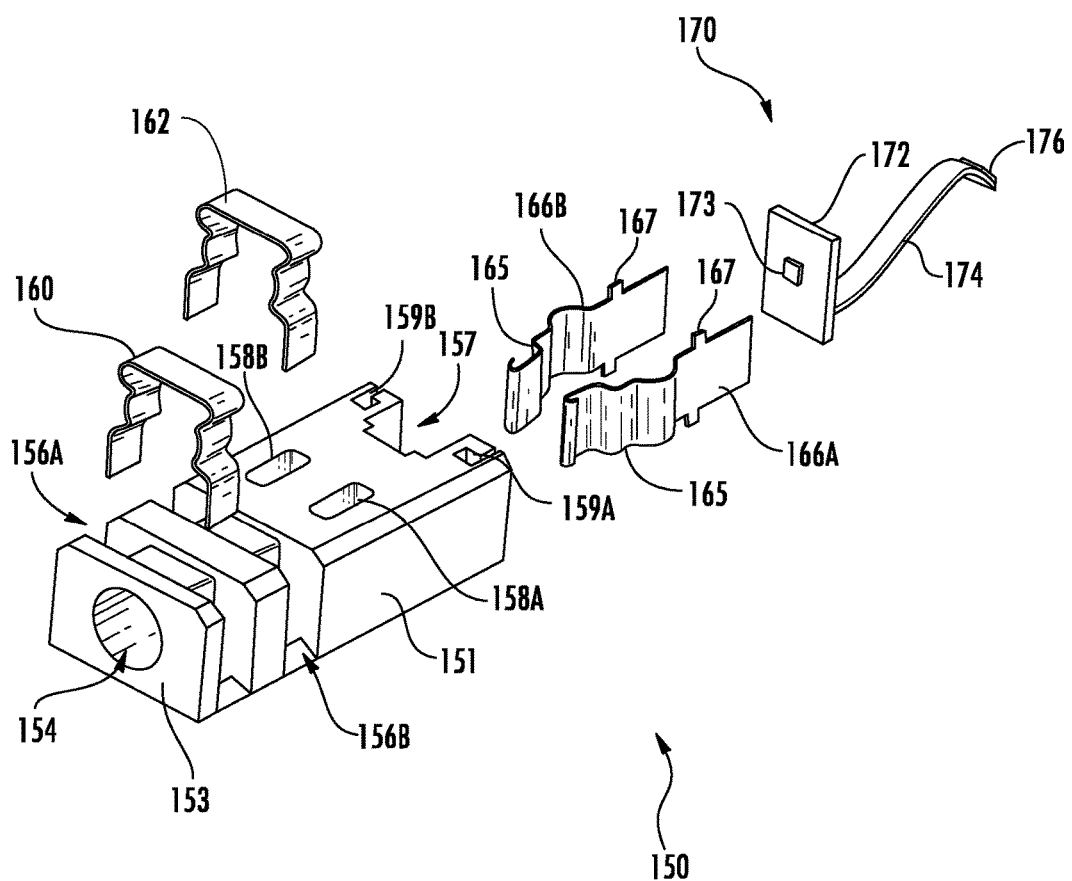
FIG. 5 is an exploded perspective view of the electro-optical receptacle depicted in FIGS. 1 and 4.
Figure 6:
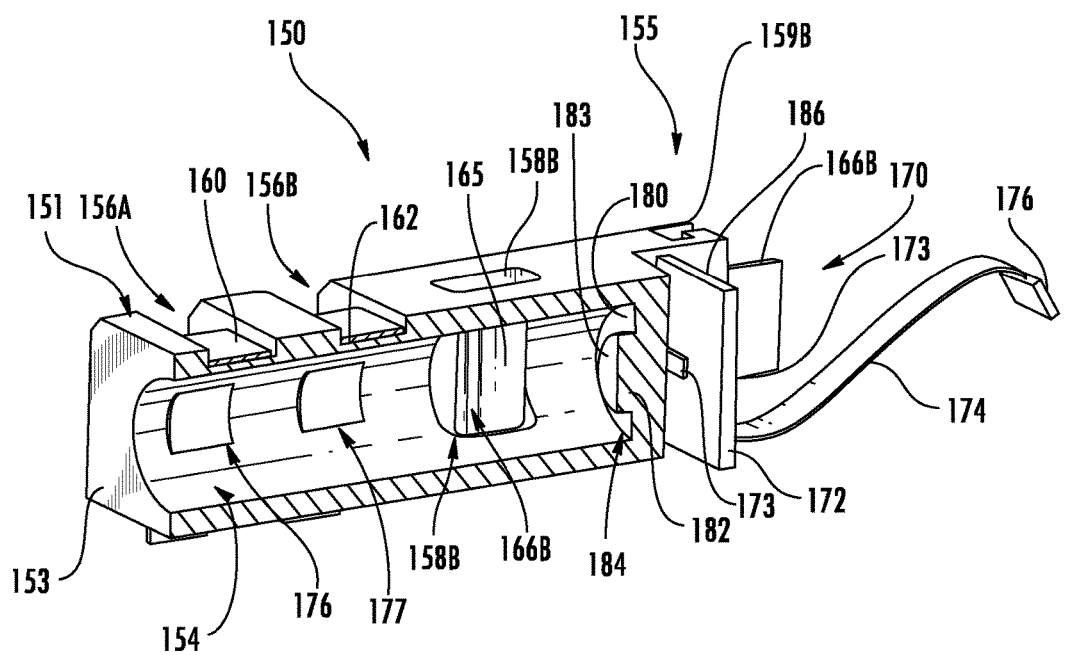
FIG. 6 is a perspective, partial cutaway view of the electro-optical receptacle depicted in FIGS. 1, 4 and 5.

Referring now to FIGS. 4-6, the example electro-optical receptacle 150 depicted in FIG. 1 will now be described in detail. FIG. 4 is a top-down, perspective view of the electro-optical receptacle 150, while FIG. 5 provides an exploded, perspective view. FIG. 6 is a cutaway view of the electro-optical receptacle 150. It should be understood that embodiments are not limited to the configuration of the electro-optical receptacle 150 depicted in FIGS. 4-6.

The receptacle body 151 has an opening for a plug bore 154 at the insertion end 153. The plug bore 154 is sized to accept the tip connector 112, the ring connector 114, and the sleeve connector 116. The receptacle body 151 further includes notches 156A, 156B into which electrical contact clips 160, 162 are disposed, respectively. The electrical contact clips 160, 162 may be maintained within the notches 156A, 156B by a snap fit, by an adhesive, and/or other securing means. The electrical contact clips 160, 162 and notches 156A, 156B are shown for illustrative purposes only, and it should be understood that other configurations are also possible.

Electrical contact clips 166A, 166B may be inserted into the optical coupling end 155 of the receptacle body 151 at openings 159A, 159B. As an example and not a limitation, the electrical contact clips 166A, 166B may have a tab portion 167 may engage the receptacle body 151 at the "L" shaped openings 159A, 159B to secure the electrical contact clips 166A, 166B to the receptacle body 151. The electrical contact clips 166A, 166B may be secured to the receptacle body 151 by any appropriate means.

The electrical contact clips 166A, 166B may further include an engagement portion 165 that acts as a detent for the tip connector 112. The engagement portion 165 of the electrical contact clips 166A, 166B may be exposed to the plug bore 154 by openings 158A, 158B, for example. The electrical contact clips 166A, 166B may act as a spring such that the engagement portion 165 moves back and forth upon insertion and removal of the electro-optical plug 101.

Referring specifically to FIG. 6, the plug bore 154 terminates at an end wall 180 at the optical coupling end 155 of the receptacle body 151. A lens feature 182 protrudes from the end wall 180. In the illustrated embodiment, the lens feature 182 is circular in shape, although embodiments are not limited thereto. The lens feature 182 has a mating surface 183 that is offset from the end wall 180. The lens feature 182 further includes a convex lens surface 186 that is opposite from the mating surface 183. The receptacle body 151, or at least the lens feature 182, is fabricated from a material that is transmissive to the wavelength(s) of the optical signals, as stated above.

As described in more detail below, the lens feature 182 defines a debris-relief zone that is located between the interior walls of the plug bore 154, the lens feature 182, and the end wall 180. Debris build up at the mating surface 183 would cause optical loss of the optical signals propagating through the lens feature 182. The debris-relief zone 184 provides an area for debris to be displaced. In some embodiments, the walls of the plug bore 154 may include channels or splines to allow for exhausting of fluids and debris out of the insertion end 153 of the receptacle body 151.

Figure 9:
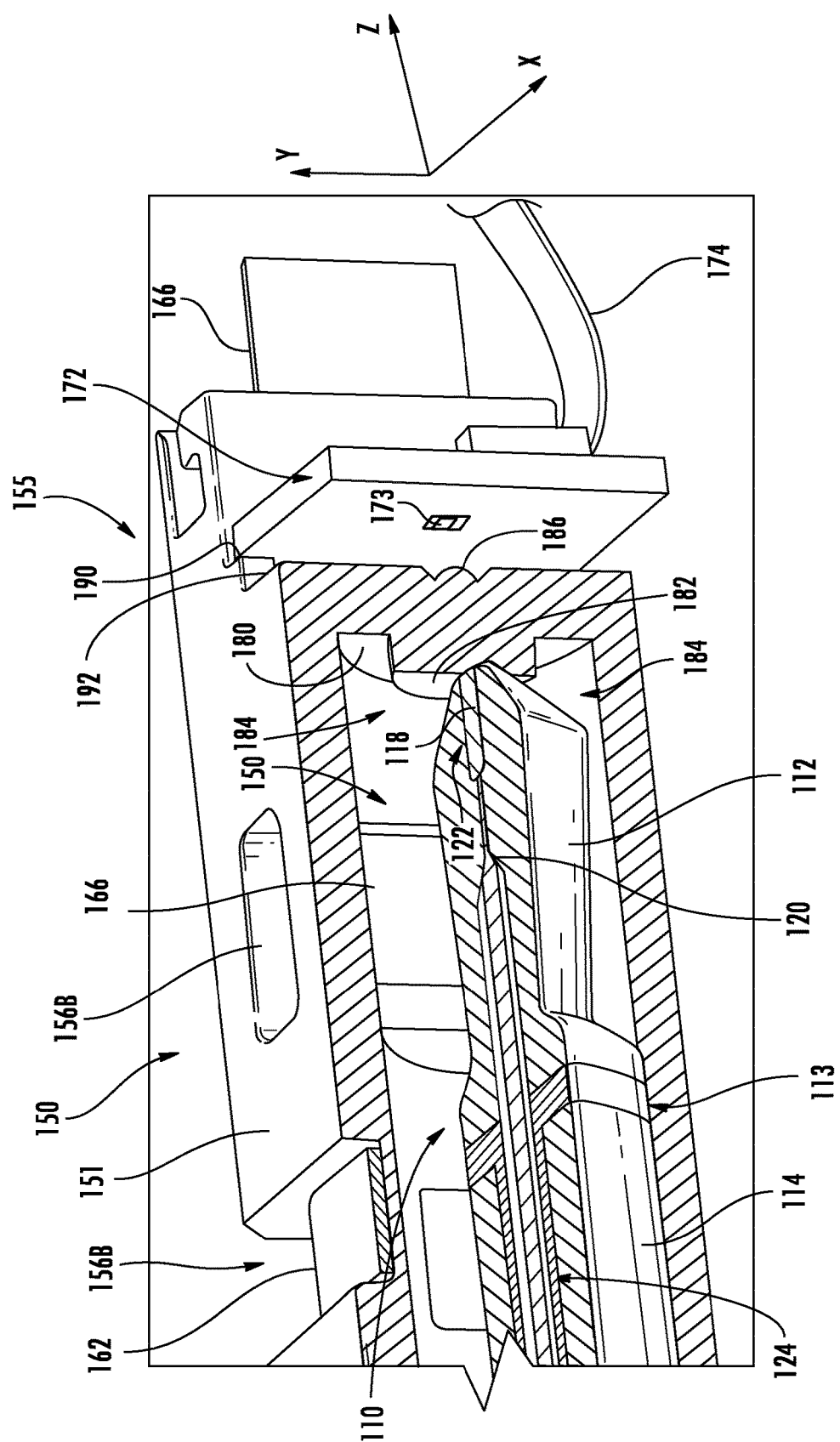
FIG. 9 is a close-up, partial cutaway view of the electro-optical plug and the electro-optical receptacle depicted in FIG. 1 wherein the electro-optical plug is inserted into the electro-optical receptacle.

Referring to both FIGS. 6 and 9, the active component assembly 170 is coupled to the optical coupling end 155 of the receptacle body 151 via a notched area 157. FIG. 9 depicts a cutaway view of the electro-optical plug 101 inserted into the electro-optical receptacle 150, which is shown in a partial cutaway view. The active component assembly 170 comprises a substrate 172, an active component 173, a flexible circuit/connector 174, and an electrical connector 175. The substrate may be configured as a circuit board, such as a printed circuit board, for example. In some embodiments, the active component 173 is configured as one or more optical devices that are configured to transmit and/or receive optical signals. In CWDM or DWDM applications, the active component 173 is capable of transmitting and receiving optical signals in accordance with the particular wavelength division multiplexing protocol so that bi-directional optical communication may be achieved using a single optical fiber.

The notch 157 at the optical coupling end 155 has a substrate mounting surface 190 and an optical coupling surface 192. The substrate 172 is coupled to the substrate mounting surface 190 such that a gap is present between the optical coupling surface 192 and the substrate 172. The substrate 172 may be coupled to the substrate mounting surface 190 by any means. The substrate 172 and the active component 173 are positioned such that the active component 173 is aligned with the convex lens surface 186 of the lens feature 182 along the x- and y-axes.

Figure 7:
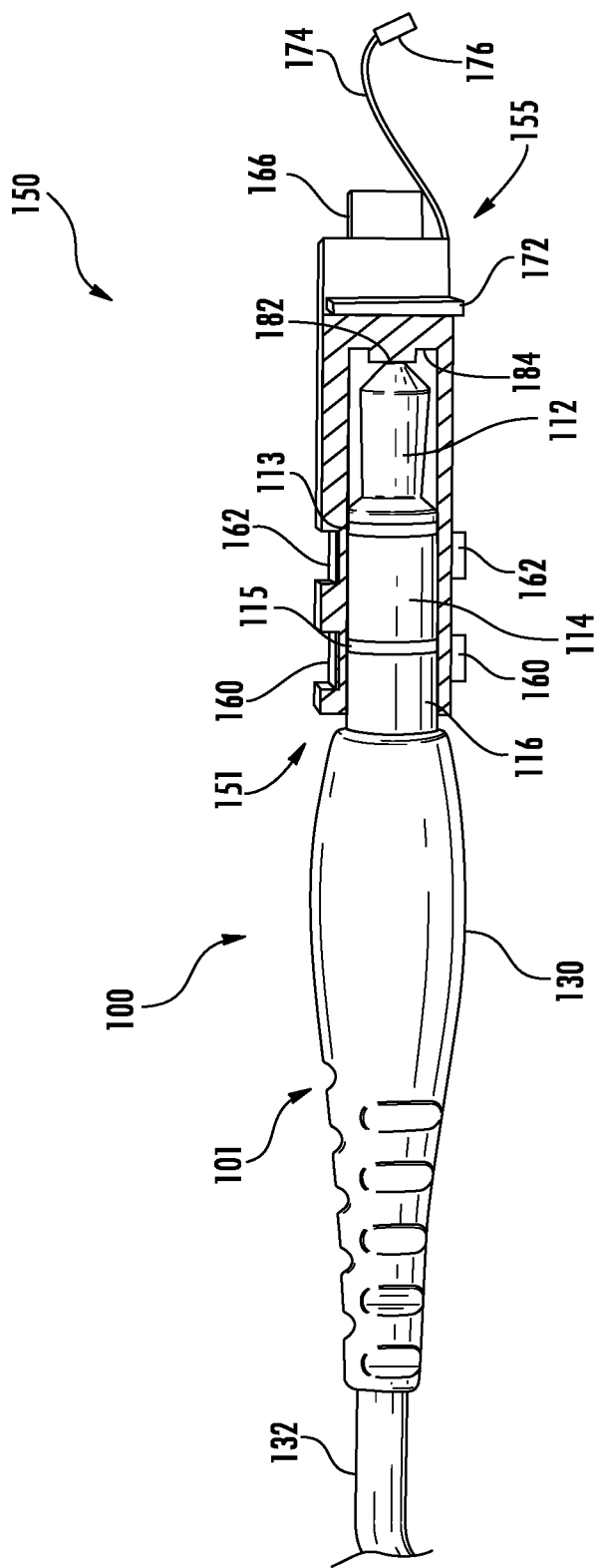
FIG. 7 is a partial cutaway view of the electro-optical connector system depicted in FIG. 1 wherein the electro-optical plug is inserted into the electro-optical receptacle.
Figure 8:
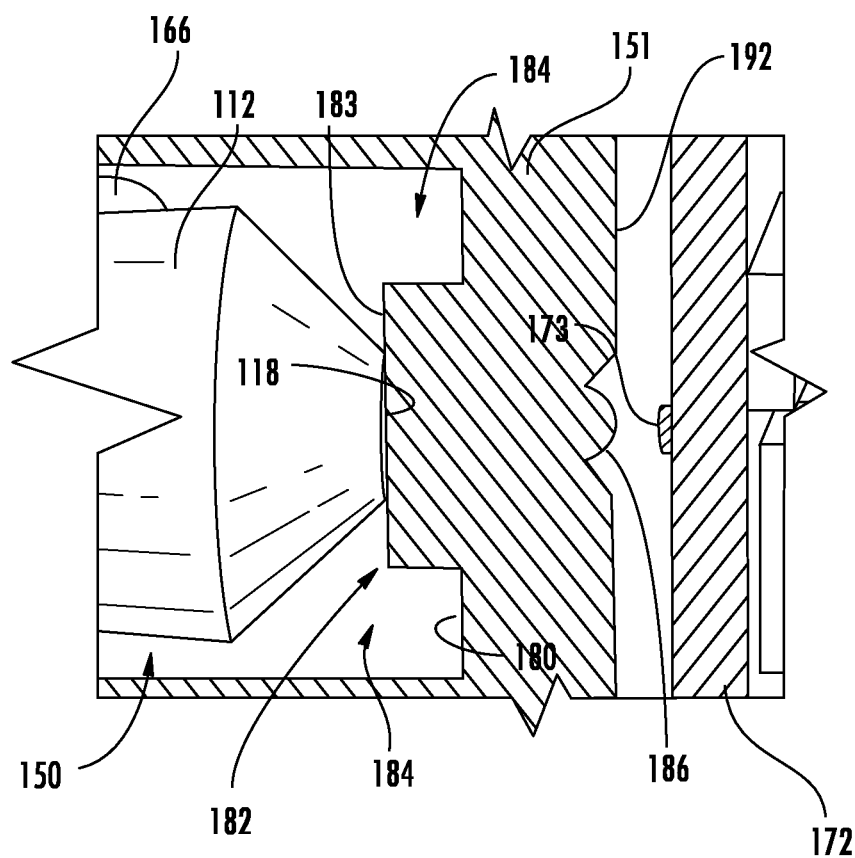
FIG. 8 is a close-up, partial cutaway view of the electro-optical connector system depicted in FIG. 1 wherein the electro-optical plug is inserted into the electro-optical receptacle.

FIG. 7 depicts the electro-optical plug 101 inserted into the electro-optical receptacle 150 in a cutaway view of the electro-optical receptacle 150. FIG. 8 is a close-up view of the tip connector and lens feature 182 depicted in FIG. 7.

Referring generally to FIGS. 6-9, the shape of the plug bore 154 and the tip connector 112, ring connector 114, and the sleeve connector 116 and the fit therebetween align the tip window 118, and therefore the GRIN lens 122, with the convex lens surface 186 along the x- and y-axis. The distance between the GRIN lens 122 and the active component 173 is determined by the thickness of the lens feature 182 and the gap between the convex lens surface 186/optical coupling surface 192 and the substrate 172. The convex lens surface 186 conditions optical signals exiting the GRIN lens 122 to be received by the active component 173, and also conditions optical signals exiting the active component 173 to be received by the GRIN lens 122.

As shown in FIGS. 8 and 9, the tapered shape of the tip connector 112 and the debris-relief zone 184 allow for debris to be contained at a location that is positioned away from the offset mating surface 183 of the lens feature 182. In some embodiments, the coupling surface 127 of the GRIN lens 122 contacts the mating surface 183 of the lens feature 182.

Figure 10:
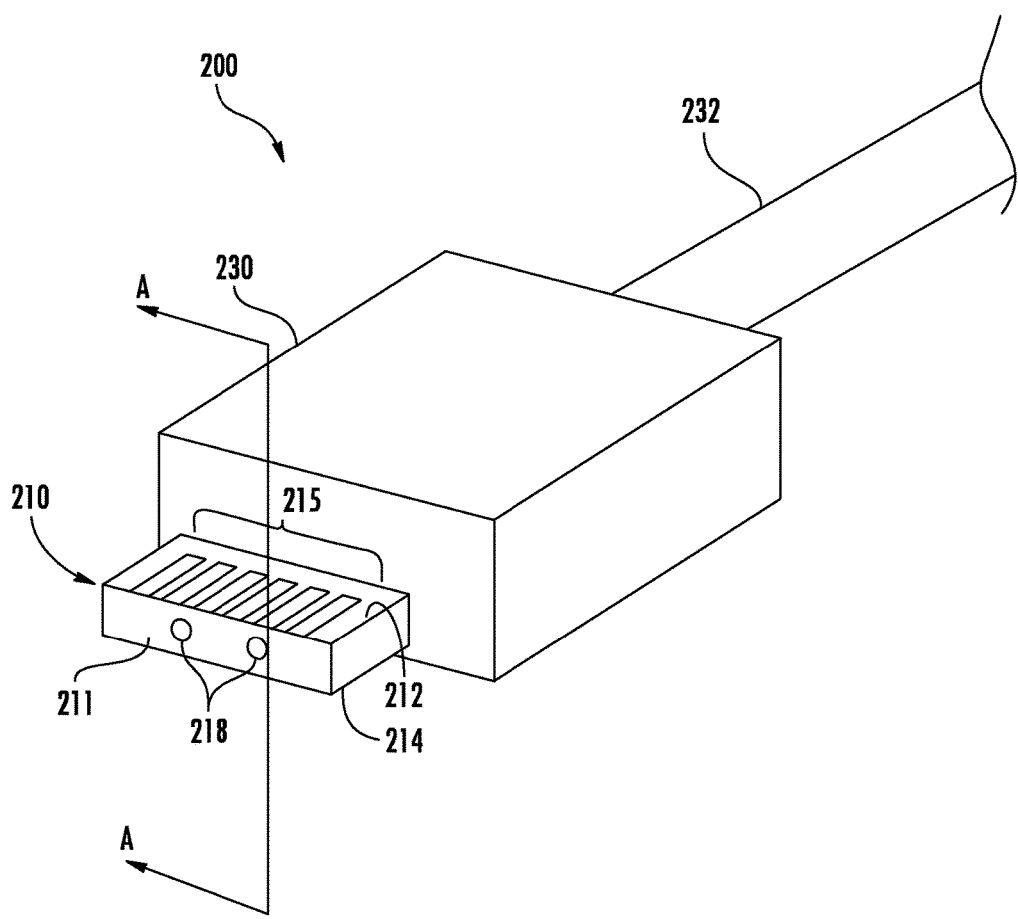
FIG. 10 is a front perspective view of an electro-optical connector according to one or more embodiments described and illustrated herein.
Figure 11:
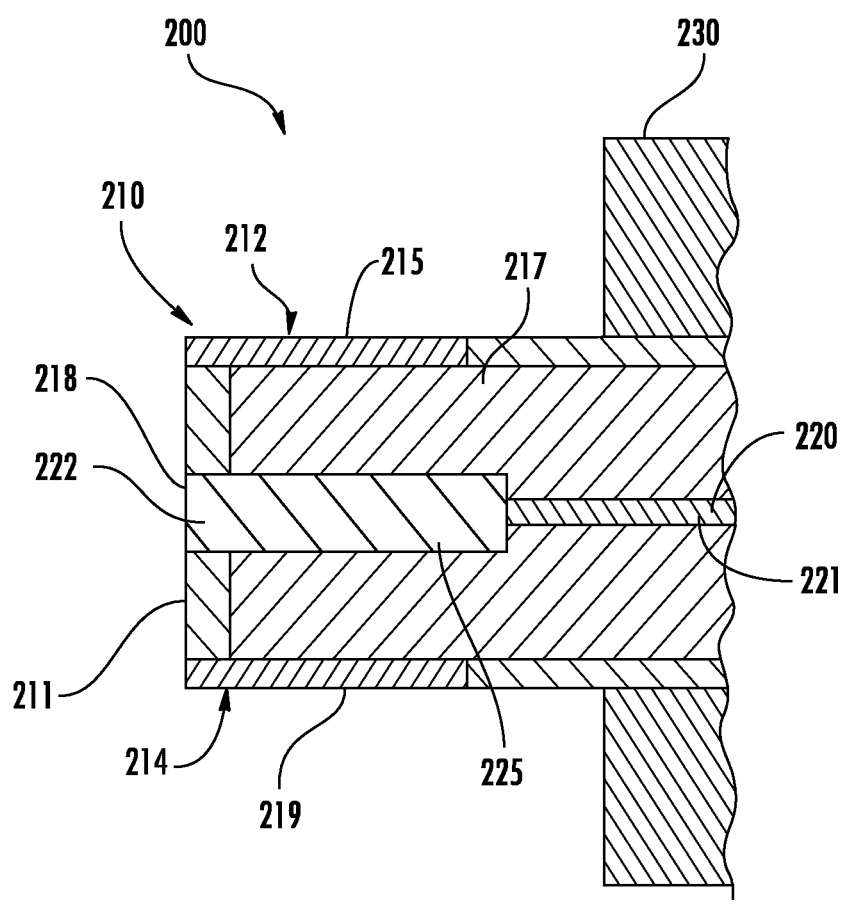
FIG. 11 is a cross-sectional view of the electro-optical connector depicted in FIG. 10 taken along line A-A according to one or more embodiments described and illustrated herein.

Referring now to FIGS. 10 and 11, another embodiment of an electro-optical connector 200 incorporating a GRIN lens 222 is depicted. FIG. 10 is a front perspective view of an example electro-optical connector 200, while FIG. 11 is a cross-sectional view of the electro-optical connector 200 depicted in FIG. 10 taken along line A-A.

The illustrated electro-optical connector 200 generally comprises a plug body 210 extending from a connector body 230, and a hybrid cable 232 extending from a rear portion of the connector body 230. The hybrid cable 232 comprises one or more optical fibers (not shown) and a plurality of conductive wire (not shown) disposed within a cable jacket. The electro-optical connector 200 may bi-directionally pass optical signals over a single optical fiber.

The plug body 210 is configured to be inserted into a corresponding electro-optical receptacle (not shown). The example plug body 210 comprises a planar electrical coupling surface 212. An array of electrically conductive contacts 215 is located at the planar electrical coupling surface 212. The array of electrically conductive contacts 215 are electrically coupled to a corresponding array of electrically conductive contacts 215 within the mated electro-optical receptacle. In some embodiments, the plug body 210 is fabricated from an electrically conductive material such that it may serve as a ground connection when mating with the mated electro-optical receptacle. In such embodiments, the individual electrically conductive contacts 215 should be provided in a non-conductive substrate that is disposed in the electrically conductive plug body 210. The electrically conductive contacts are coupled to conductive wires within the hybrid cable 232.

In some embodiments, the plug body 210 further includes a second array of electrically conductive contacts 219 on a second planar electrical coupling surface 214. The second array of electrically conductive contacts 219 may be electrically connected to the array of electrically conductive contacts 215 to provide for palindromic connection with the mated electro-optical receptacle, or it may provide an array of electrical contacts that are independent from the array of electrically conductive contacts 215.

The illustrated electro-optical connector 200 further comprises an optical coupling surface 211 that is transverse to the planar electrical coupling surface 212. One or more optical windows 218 are provided at the optical coupling surface 211. The optical windows 218 optically expose a coupling surface of embedded GRIN lenses 222 that may be optically coupled to lens features and active components of a mated electro-optical receptacle.

Referring now to FIG. 11, a lens support member 217 may be provided in the plug body 210. The lens support member 217 includes at least one lens bore 225 that maintains a GRIN lens 222 and at least one fiber bore 220 that maintains an optical fiber. In the illustrated embodiment, the lens support member 217 includes two lens bores 225 and two fiber bores 220 to secure two GRIN lenses 222 and two optical fibers 221. The lens support member 217 may also support the arrays of electrically conductive contacts 215, 219. In some embodiments, the lens support member 217 is configured as a circuit board having the lens bore(s) 225 and fiber bore(s) 220 disposed therein.

The optical fiber 221 is optically coupled the GRIN lens 222 (e.g., by use of an index-matching adhesive). As described above, the surfaces of the GRIN lens 222 may be laser polished. The optical window 218 may physically expose the coupling surface of the GRIN lens 222, or an optically transmissive material may be provided at the optical window 218.

It will be apparent to those skilled in the art that various modifications and variations can be made without departing from the spirit or scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. An electro-optical connector comprising:
   a connector body;
   a plug body extending from a surface of the connector body, the plug body comprising:
      a planar electrical coupling surface comprising an array of electrically conductive contacts, wherein the array of electrically conductive contacts are operable to be electrically coupled to a corresponding array of electrically conductive contacts of a mated electro-optical receptacle at the planar electrical coupling surface; and
      an optical coupling surface comprising at least one optical window, wherein the optical coupling surface is transverse to the planar electrical coupling surface, and at least a portion of the planar electrical coupling surface is positioned between the optical coupling surface and the surface of the connector body;
   at least one gradient-index lens disposed within the plug body, wherein a coupling surface of the gradient-index lens is optically exposed at the at least one optical window;
   at least one optical fiber optically coupled to the at least one gradient-index lens; and
   a lens support member disposed within the plug body, the lens support member comprising a lens bore and a fiber bore, wherein the gradient-index lens is disposed in the lens bore and the optical fiber is disposed in the fiber bore.

2. The electro-optical connector of claim 1, wherein:
   the plug body further comprises a second planar electrical coupling surface opposite from the planar electrical coupling surface;
   the second planar electrical coupling surface comprises a second array of electrically conductive contacts; and
   the second array of electrically conductive contacts is electrically coupled to the array of electrically conductive contacts.

3. The electro-optical connector of claim 2, wherein the electro-optical connector has a palindromic configuration.

4. The electro-optical connector of claim 1, wherein the at least one optical window comprises a single optical window, the at least one gradient-index lens comprises a single gradient-index lens, and the at least one optical fiber comprises a single optical fiber.

5. The electro-optical connector of claim 1, wherein the at least one optical window of the plug body physically exposes the coupling surface of the at least one gradient-index lens at the front surface of the plug body.

6. An electro-optical connector comprising:
   a plug body comprising:
      a first planar electrical coupling surface comprising an array of electrically conductive contacts;
      a second planar electrical coupling surface opposite from the first planar electrical coupling surface, wherein the second planar electrical coupling surface comprises a second array of electrically conductive contacts; and
      an optical coupling surface comprising at least one optical window, wherein the optical coupling surface is transverse to the first planar electrical coupling surface;
   at least one gradient-index lens disposed within the at least one optical window of the plug body, wherein a coupling surface of the gradient-index lens is optically exposed at the at least one optical window and disposed between the first planar electrical coupling surface and the second planar electrical coupling surface;
   at least one optical fiber optically coupled to the at least one gradient-index lens; and
   a lens support member disposed within the plug body, the lens support member comprising a lens bore and a fiber bore, wherein the gradient-index lens is disposed in the lens bore and the optical fiber is disposed in the fiber bore.

7. The electro-optical connector of claim 6, wherein the electro-optical connector has a palindromic configuration.

8. The electro-optical connector of claim 6, wherein the second array of electrically conductive contacts is electrically coupled to the array of electrically conductive contacts.

9. The electro-optical connector of claim 6, wherein the at least one optical window comprises a single optical window, the at least one gradient-index lens comprises a single gradient-index lens, and the at least one optical fiber comprises a single optical fiber.

10. The electro-optical connector of claim 6, wherein the at least one optical window of the plug body physically exposes the coupling surface of the at least one gradient-index lens.

11. A palindromic electro-optical connector comprising:
    a plug body comprising:
       a first planar electrical coupling surface comprising an array of electrically conductive contacts, wherein the array of electrically conductive contacts is operable to be electrically coupled to a corresponding array of electrically conductive contacts of a mated electro-optical receptacle at the first planar electrical coupling surface;
       a second planar electrical coupling surface opposite from the first planar electrical coupling surface, wherein the second planar electrical coupling surface comprises a second array of electrically conductive contacts, and the second array of electrically conductive contacts is operable to be electrically coupled to a corresponding second array of electrically conductive contacts of the mated electro-optical receptacle at the second planar electrical coupling surface; and
       an optical coupling surface comprising at least one optical window, wherein the optical coupling surface is transverse to the first planar electrical coupling surface;
    at least one gradient-index lens disposed within the plug body, wherein a coupling surface of the gradient-index lens is optically exposed at the at least one optical window and disposed between the first planar electrical coupling surface and the second planar electrical coupling surface;
at least one optical fiber optically coupled to the at least one gradient-index lens; and
a lens support member disposed within the plug body, the lens support member comprising a lens bore and a fiber bore, wherein the gradient-index lens is disposed in the lens bore and the optical fiber is disposed in the fiber bore.

12. The palindromic electro-optical connector of claim 11, wherein the second array of electrically conductive contacts is electrically coupled to the array of electrically conductive contacts.

13. The palindromic electro-optical connector of claim 11, wherein the at least one optical window comprises a single optical window, the at least one gradient-index lens comprises a single gradient-index lens, and the at least one optical fiber comprises a single optical fiber.

14. The palindromic electro-optical connector of claim 11, wherein the at least one optical window of the plug body physically exposes the coupling surface of the at least one gradient-index lens.

15. The electro-optical connector of claim 1, wherein the plug body is comprises an electrically conductive material, and the array of electrically conductive contacts is positioned within a non-conductive substrate disposed within the planar electrical coupling surface of the plug body.

16. The electro-optical connector of claim 6, wherein:
the plug body comprises an electrically conductive material;
the array of electrically conductive contact is positioned within a first non-conductive substrate disposed within the first planar electrical coupling surface of the plug body; and
the second array of electrically conductive contact is positioned within a second non-conductive substrate disposed within the second planar electrical coupling surface of the plug body.

17. The palindromic electro-optical connector of claim 11, wherein:
the plug body comprises an electrically conductive material;
the array of electrically conductive contact is positioned within a first non-conductive substrate disposed within the first planar electrical coupling surface of the plug body; and
the second array of electrically conductive contact is positioned within a second non-conductive substrate disposed within the second planar electrical coupling surface of the plug body.

18. The electro-optical connector of claim 1, wherein the at least one gradient-index lens is within a plane that is orthogonal to the planar electrical coupling surface and that intersects the planar electrical coupling surface.

19. The electro-optical connector of claim 6, further comprising a connector body, wherein the plug body extends from a surface of the connector body.

20. The electro-optical connector of claim 1, wherein the plug body terminates at the optical coupling surface.

* * * * *